(12) United States Patent
Massabo et al.

(10) Patent No.: US 6,281,905 B1
(45) Date of Patent: Aug. 28, 2001

(54) METHOD FOR MODIFYING A DISPLAY OF A SHAPE

(75) Inventors: Alain Massabo; André Lieutier; Gérard Durand; Jacques Goussard, all of Aix En Provence (FR)

(73) Assignee: Matra Datavision, Paris (FR)

( * ) Notice: Subject to any disclaimer, the term of this patent is extended or adjusted under 35 U.S.C. 154(b) by 0 days.

(21) Appl. No.: 09/167,666

(22) Filed: Oct. 7, 1998

(30) Foreign Application Priority Data

Oct. 8, 1997 (FR) ................................... 97 12546

(51) Int. Cl.$^7$ .................................................. G06T 11/00
(52) U.S. Cl. .......................... 345/433; 345/429; 345/442; 345/440; 345/473; 345/474
(58) Field of Search .................... 345/420, 424, 345/429, 475, 474, 433, 419, 440, 441, 442, 473

(56) References Cited

U.S. PATENT DOCUMENTS

| 4,821,214 | 4/1989 | Sederberg | 364/522 |
| 5,566,281 | * 10/1996 | Tokumasu et al. | 345/420 |
| 5,731,819 | * 3/1998 | Gagne et al. | 345/433 |

FOREIGN PATENT DOCUMENTS 0576218  12/1993 (EP).

OTHER PUBLICATIONS

Wang et al. "Surface Reconstruction Using Deformable Models with Interior and Boundary Constraints", IEEE Conference, 1992, pp. 572–579.*

Takahashi et al. "Curve and Surface design Using Multiresolution Constraints", IEEE Conference, Jul. 1997, pp. 121–130.*

Terzopoulos D Et Al: "Dynamic Nurbs with Geometric Constraints for Interactive Sculpting" ACM Transactions on Graphics, vol. 13, No. 2, April. , 1994, pp. 103–136, XP000461727 *p. 113. ligne 3–ligne 14*.

Wen–Hui Du Et Al: "On the G1 Continuity of Piecewise Bezier Surfaces: A Review with New Results" Computer Aided Design, vol. 22, No. 9, Nov. 1, 1990, pp. 556–573, XP000165208 * p. 557, colonne de gauche, ligne 25–colonne de droite, ligne 15*.

Hoseok K Et Al: "Deforming virtual objects interactively in accordance with an elastic model" Computer Aided Design, vol. 28, No. 4, Apr. 1996, p. 251–262 XP004022714.

* cited by examiner

Primary Examiner—Mark Zimmerman
Assistant Examiner—Kimbinh T. Nguyen
(74) Attorney, Agent, or Firm—Nath & Associates PLLC; Gary M. Nath; Marvin C. Berkowitz

(57) ABSTRACT

For modifying a zone of a surface having an original shape, outer constraints are defined at boundaries of the zone as continuities $G^k$ along at least part thereof. Inner constraints $G^n$ are defined as points or curves to be crossed by the zone when modified. An amount of deformation is defined in each point of the zone as a result of a resilient deformation of a generalized infinite thin planar plate in equilibrium, respecting the outer and inner constraints. The modified zone is generated as a surface resulting from a result of an application of the resilient deformation to the original shape in the zone and connected to the unmodified portion of the surface.

6 Claims, 3 Drawing Sheets

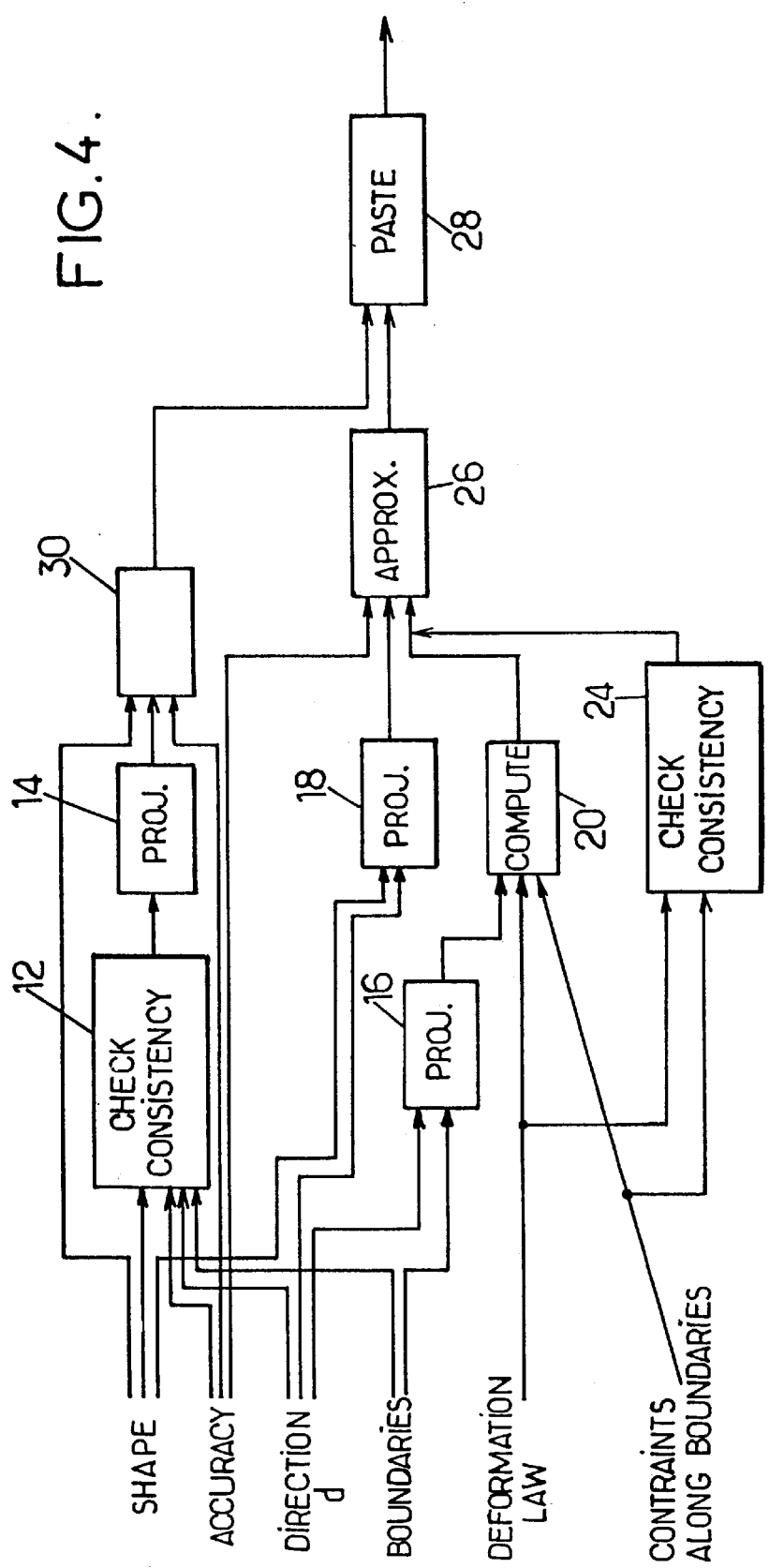

METHOD FOR MODIFYING A DISPLAY OF A SHAPE

BACKGROUND OF THE INVENTION

The invention relates to a method for modifying a display of a shape, suitable for enabling a user of a CAD system to modify a shape and for providing a display of the modified shape.

In the following, the word << surface >> will frequently be used. It should be understood in a broad sense and designating a surface properly speaking as well as surface-like piece-wise $G^k$-continuous defined shape or a << skin >> of a volume, with k being an integer at least equal to zero, and even presenting some rips (in which case k=-1).

Engineering or styling (aesthetic) requirements may render advisable modifications of a part, or zone, of a pre-existing surface, or even of a whole surface, defined by a topology thereof for making the modified surface passing by locations indicated by a user, such as points or curves with or without tangent planes and normal curvatures fits. Such requirements constitute inner constraints. The modifications should simultaneously respect external constraint: the modified zone must have, within prescribed tolerances, a continuity or smooth transition with the unmodified part of the original surface.

Another problem which may occur in styling or engineering is to generate a display of a curved surface filling a predetermined zone, respecting external constraint along the boundary of the zone and respecting inner constraint. EP-A-0 576 218 discloses a method for solving that problem, which is however limited to obtaining a continuity not exceeding $G^1$ at the boundaries. That prior art method comprises generating a partial differential equation representing the surface as a physical membrane. That method is not used for modifying a pre-existing shape and does not enable to achieve a higher continuity order at the boundaries.

SUMMARY OF THE INVENTION

A first object of the invention is to provide an improved method for modifying an existing zone while respecting a continuity $G^k$ (with k being at least -1) at boundaries and respecting inner constraints.

For that purpose, there is provided a method comprising the steps of:

(a) defining outer constraints of said zone as being continuities $G^k$ along at least part of said boundaries, with k being an integer at least equal to minus one;

(b) defining inner constraints $G^n$ on predetermined points or curves to be respected by said zone when modified, with n being an integer at least equal to zero;

(c) selecting a deformation direction law for all points of said zone;

(d) defining a deformation in each point of said zone in a direction fulfilling said law as a result of a resilient deformation of a generalized infinite thin planar plate in equilibrium, respecting said outer and inner constraints; and (e) generating a modified zone as a surface zone resulting from an application of said resilient deformation to said zone of the original shape.

A continuity $G^0$ is only a location constraint; a continuity or order 1 is a tangent plane nappe constraint. A continuity of order 2 respects the normal curvatures in all directions at a point or along a curve. Higher values of k and n are possible and have no simple geometrical counterpart. Sometimes a rip is to be obtained between the modified zone and the remainder of the surface and is designated as a continuity $G^{-1}$.

The word "generalized" should be construed as designating a behaviour which may go beyond that of an actual thin plate subjected to mechanical actions (forces or torques) which tend to deform it. The generalization is in respect of mechanical actions and the expression of the "energy" to be minimized. Beyond $G^2$, that may be considered as ultra-reality.

A continuity $G^0+G^1$ along a side of the boundary requires that the "generalized" plate representing the deformation is planar along that side. An outer constraint $G^0$ at the boundary may be regarded, by analogy with mechanical considerations, as the requirement that there is a determined distribution of forces along the boundary. For constraints $G^1$, the analogy with a plate corresponds to the application, along the boundary, of torques having a determined distribution in addition to the distribution of forces. Beyond $G^1$, there is no analogy with deformation of material. But it has been found that an increase of k results in a deformation shape which has stronger slopes.

The above-defined method may be used whatever the number of curved sides of the zone and whatever the number of vertices of the boundary, the boundary being open or not, as seen on FIGS. 1A, 1B, 1C, 1D.

Continuity will be strictly fulfilled in certain points of the boundaries, where it is actually defined. As a rule, a maximum value of the discrepancy between the edge of the modified zone and the original surface will be prescribed. For fulfilling the later condition, a trial and error method may be used: the number of points located on the boundaries where the continuity requirement is strictly respected (however subject to the quantification accuracy) until the sought precision degree be attempted for all intermediary points.

When modifying a zone, the constraints are those to be fulfilled along sides of the boundary and similar constraints at locations which are contained within the deformed zone, the target is a minimization of the generalized energy of the deformation.

Frequently, the inner constraints may be geometrical. For instance (and this is not exhaustive):

the surface-like model may be required to pass by at least one determined point or by determined curve;

an inner constraint may be that the deformed shape has a tangent plane of determined direction at a predetermined point.

More generally, an inner constraint may be constituted by the definition of a point and/or a curve:

by which the model should pass, and/or at which the tangent plane and/or an osculatory plane nappe are predetermined, and/or at which the normal curvatures and the osculatory second order surface is predetermined (it requires the tangent nappe constraint).

According to another aspect of the invention, a method of modifying a zone of a surface while respecting outer constraints as continuities $G^k$ with k at least -1 and inner constraints $G^n$ with n at least equal to zero implies defining a deformation which corresponds to a minimum over the whole parametric space of:

$$E(\phi) = \int_{R^2} (\nabla^m \phi)^2 \quad (1)$$

where $R^2$ is a two-dimensional parametric space on which said boundaries are projected, $\nabla$ is the gradient operator, m is a power at least equal to Sup{k,n}+2 and $\phi$ is a deformation function representing the deformation.

The search for a minimum should be made while respecting the continuity constraints along each of the sides of the zone to be deformed. The boundary may be closed or open.

In the above formula, m=1 has a physical meaning: the function $E(\phi)$ defines the linear energy of an infinite horizontal membrane subjected to a uniform strain, when the vertical displacement field is $\phi$.

For m=2, $E(\phi)$ defines the linear resilient flexure energy of an infinite horizontal thin plate having a Poisson coefficient equal to zero, whose vertical displacement field is $\phi$.

m=3 has no determined dynamics meaning, but represents a solution which causes smooth variations, of particular interest as regards aesthetic aspect, notably regarding the evolution of light reflection on the modified surface.

Another object of the invention is to fill a hole in a surface or to generate a patch while respecting outer constraints $G^k$ with k at least equal to 2 and inner constraints $G^n$ with n at least equal to zero. As indicated above, the method disclosed by European patent 0 576 218 is only apt to respect outer constraints $G^0$ or $G^1$.

For that purpose, there is provided a method of modifying a display of the shape having a source surface by generating a zone connected to the source surface along boundaries, comprising the steps of:

(a) defining boundaries of said zone as outer constraints as continuities $G^k$ along at least one part of said boundaries, with k being an integer at least equal to 2;

(b) defining inner constraints $G^n$ on points and curves to be respected by said zone when generated; with n being an integer at least equal to zero;

(c) defining said zone as resulting from a resilient deformation of a generalized infinite thin planar plate in equilibrium, respecting said outer and inner constraints; and (d) generating a display of said source surface and said zone connected thereto at said boundaries.

The above and additional features will appear more clearly from a reading of the following description of a particular embodiment given as an example only. The description refers to the accompanying drawings.

BRIEF DESCRIPTION OF THE DRAWINGS

FIG. 4 is a simplified block diagram indicating steps taken for determining the amounts of deformation.

DETAILED DESCRIPTION OF THE INVENTION

Figure 1A:
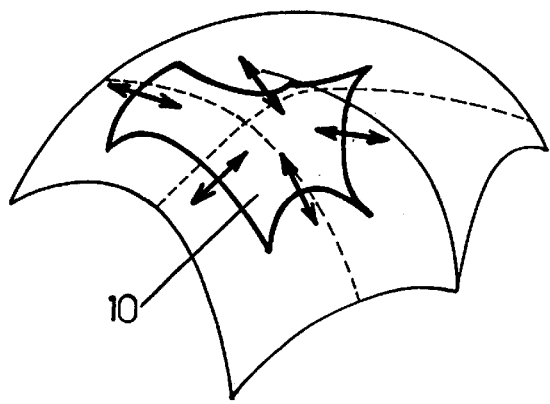
FIGS. 1A, 1B, 1C, 1D, already mentioned, show possible deformations of a zone of a surface.
Figure 1B:
Figure 1C:
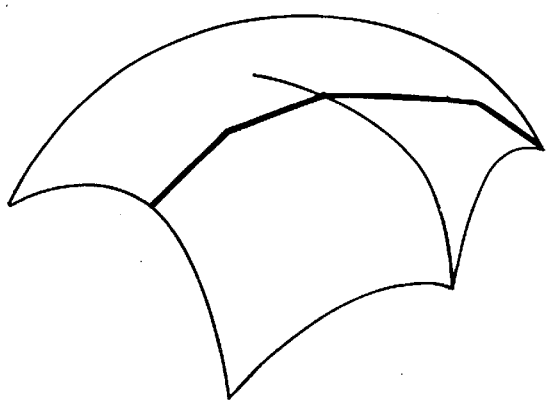
Figure 1D:
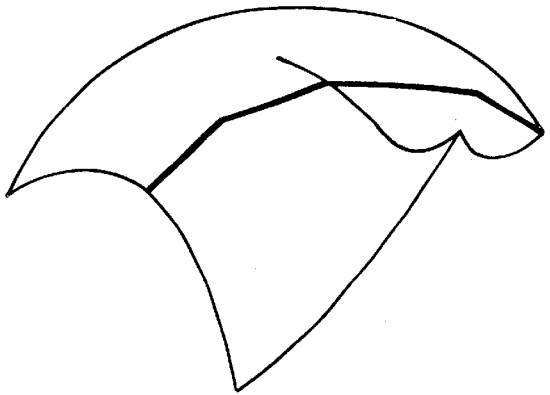

FIGS. 1A and 1B illustrate an example of use of the invention. Zone 10 of FIG. 1A, defined by five curved sides and having as many vertices, should be deformed for moving it up to point A while respecting a $G^1$ continuity (as indicated by double arrows). That means that the planes tangent to the source surface along the borders should remain tangent to the deformed zone and to the balance of the source surface (FIG. 1B). As shown on FIGS. 1A and 1B, the zone to be deformed is closed. However, the invention is also applicable to an open zone (FIGS. 1C and 1D).

Moreover, a rip may appear between the deformed zone and the balance of the initial surface by requiring a $G^{-1}$ constraint on a side of the boundary shown on FIG. 1A.

Figure 2:
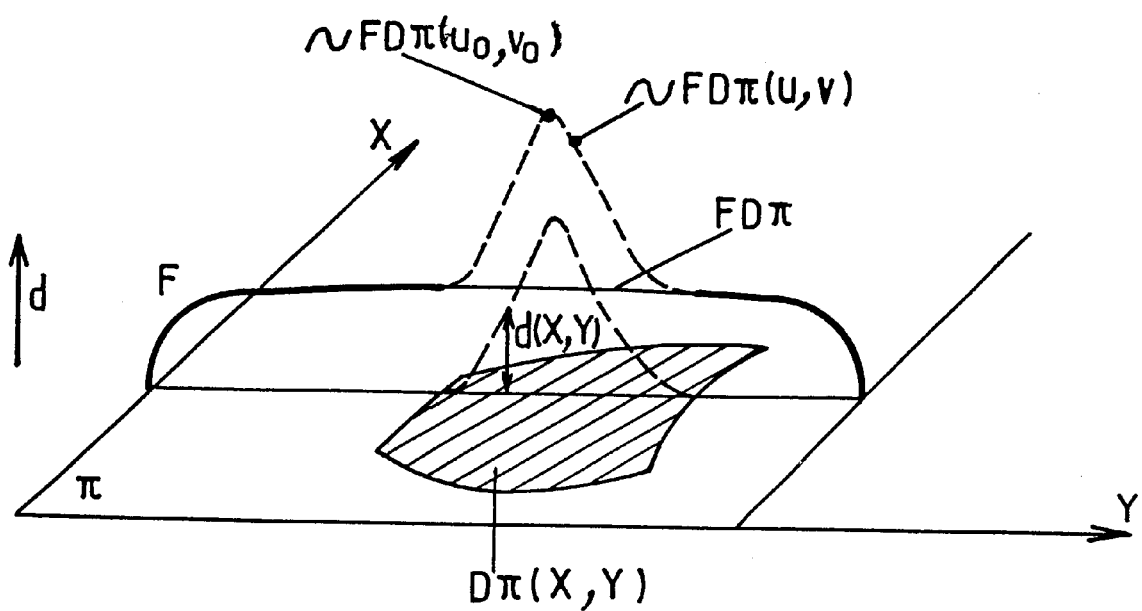
FIG. 2 is a schematic representation of the deformation, in only one plane parallel to a common direction of deformation, illustrating the parameters which intervene in the deformation.

Referring to FIG. 2, the mathematics implemented by the invention will be described when considering only one slice of the surface to be modified, parallel to the selected deformation direction d. Then the deformation direction law consists in selecting a same direction of deformation for all points. The boundaries defining the zone to be modified are projected in a direction parallel to d onto a perpendicular plane Π. They constitute a planar domain DΠ(X,Y) on which the deformation law d(X,Y) may be defined. Then d corresponds to $\phi$ in formula (1) thereabove. The planar coordinates X and Y correspond to coordinates u, v of the initial shape of the zone to be deformed. Generally, the curved sides of the zone will be defined as an approximation by polynomial (or rational) parametric equations selected for providing the required accuracy.

In the plane parallel to d which is indicated in FIG. 2, that zone DΠ of the global shape F which is within DΠ will be modified for providing $\sim F_{D\Pi}$.

The finally modified shape will be obtained by bonding $\sim F_{D\Pi}$ and restriction $(F-F_{D\Pi})$.

For computation, $F_{D\Pi}$ is expressed, in the axes within the DΠ plane, as $X_{D\Pi}(u,v)$ $Y_{D\Pi}(u,v)$ $F_{D\Pi(u,v)}$ Their relation between the parameters will be $\sim F_{D\Pi}(u,v)$=Approximation $[F_{D\Pi}(u,v)+d(X_{D\Pi}(u,v), Y_{D\Pi}(u,v))]$ As illustrated in FIG. 2, the outer constraints are the requirement that the deformation law maintains the normal curvatures along the boundary ($G^2$ continuity)=. Then m=2+2 i.e., 4. If on the other hand m=0, then equation (1) may be developed as $$\int_0^\infty \left[ \frac{\partial^2 \phi}{\partial u^2} + 2\left(\frac{\partial^2 \varphi}{\partial u \cdot \partial v}\right)^2 + \left(\frac{\partial 2\varphi}{\partial v2}\right) \right] du \cdot dv$$

An inner constraint may be introduced by a mancomputer interface, such as a mouse, a track ball or any other unit for manipulating a handle on a screen.

The inner constraint may be the requirement that the deformed zone passes by a point $\sim F_{D\Pi}(u_0,v_0)$ where the direction of the original tangential plane is retained. Then the partial derivatives with respect to $(u_0,v_0)$ must fulfil the conditions:

∂d/∂u=0

∂d/∂v=0

That condition is set before the necessary approximations, as will be shown thereunder. The approximations are made on the smallest planar rectangle which contains DΠ in the projection plane.

Before reference is made to a mathematical definition of the deformation laws, it may be useful to provide an explanation based on a comparison with the resilient deformation of an infinite thin planar plate in equilibrium, subjected to a distribution of generalized forces or torques along the boundaries of the domain which is determined for respecting continuity constraints. When the order of the constraint is k (requirement for continuity $G^k$), the modified shape will preferably result from the search of a minimum of the energy of order m=k+2. The solution as a polynomial representation (acceptable by most CAD and CAM systems) will be obtained by an approximation, since the theoretical optimum solution requires logarithms.

It is essential to keep in mind that the deformation d(X,Y) is that of a plate which is initially planar and infinite, and not that of a plate having the original shape, in a mathematical analogy.

Figure 3:
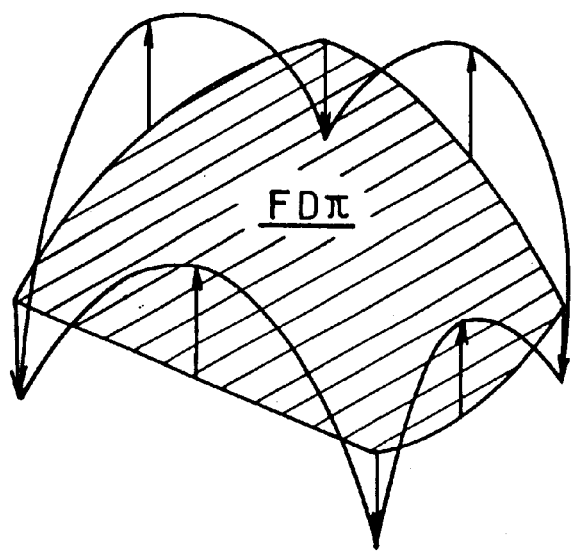
FIG. 3 is a schematic view illustrating a possible distribution of forces at equilibrium enabling to compute the modified zone with constraints $G^0$ along the boundary.

Referring to FIG. 3, a force distribution corresponding to a particular deformation, with a constraint of crossing the sides of a domain has been illustrated, as an example.

More generally, and as seen earlier, the approach which makes it possible to determine the shape while respecting outer constraints (edge constraints) and inner constraints (for instance crossing a predetermined location) will consist in finding the deformation which corresponds to a minimum of the energy E(ϕ) given by formula (1). That approach may constitute extrapolation and adaptation of that described in the paper << An Aesthetic Preserving Algorithm for Accuracy Incompatible Modelers Data Exchange >> by G. Durant, A. Leutier and A. Massabo, IDMME, 1996.

Referring to FIG. 4, the functions to be fulfilled when implementing the method are illustrated. Some of the functions are optional. Most functions are already implemented in software modules available on the market.

The input parameters, delivered by a human operator, comprise at least identification of edges of the zone to be modified, which can be introduced by pointing on a screen or as coordinate, the direction of deformation d (or the law of direction when the directions changes from place to place), the constraints to be respected along the edges, last, the shape features which should be fulfilled by the deformation model (inner constraints).

A first software module 12 may be provided for verifying consistency between at least the shape to be achieved, the deformation direction d and the boundaries. In certain cases, a deformation along a single direction d could be insufficient for respecting the inner constraints required from the model.

After consistency is checked, the shape is processed by a module 14 which delivers a projection thereof parallel to direction d (on plane Π on FIG. 2).

The projection of the boundaries onto plane Π, along direction d, is also determined by a module 16.

Another module 18 computes the projection of the shape on plane Π.

The amounts of deformation d(X,Y) are computed by a module 20 which applies an algorithm of the type "resilient generalized infinite thin plate", as mentioned above, while respecting the applicable constraints. The algorithm is applied in plane Π, i.e. from a planar shape, not in the 3D space. The obtained amounts of deformation are applied to the original "surface" in the selected zone before being modified.

Last, a bonding step is carried out by the module 28 between the computed model and the shape of the remaining "surface", previously computed in a module 30, by removing the modified zone.

Accuracy requirements will have to be respected as to bonding of the modified surface with the remaining surface or as to mutual bonding of sections of the modified shape. Then the manually introduced parameters include accuracy indications, taking account of the initial inner continuity of the shape to be modified.

The problem of respecting a certain degree of accuracy exists particularly when the surface to be modified includes a plurality of surface-like elements which are mutually connected along lines which mutually match with a limited accuracy only (for instance due to earlier approximations). Then bonding should be made after approximation while respecting the accuracy constraints. The approximation can be made either on the deformed shape or on the amount of deformation.

What we claim is:

1. A method of modifying a display of a zone of a surface having an original shape, comprising the steps of:
    (a) defining outer constraints at boundaries of said zone as continuities $G^k$ along at least part of said boundaries, with k being an integer at least equal to minus one;
    (b) defining inner constraints $G^n$ as points or curves to be crossed by said zone when modified, with n being an integer at least equal to zero;
    (c) selecting a deformation direction law for all points of said zone;
    (d) defining an amount of deformation in each point of said zone as a result of a resilient deformation of a generalized infinite thin planar plate in equilibrium, respecting said outer and inner constraints; and
    (e) generating a modified zone as a surface resulting from a result of an application of said resilient deformation to said original shape in said zone.

2. A method according to claim 1, wherein said deformation direction law consists in selecting a same direction of deformation for all points of the zone of the original shape.

3. A method according to claim 1, further comprising a step of verifying consistency between the modified zone to be obtained, the deformation direction and the boundaries.

4. A method according to claim 1, wherein at least one of k and n is at least equal to 2.

5. A method of modifying a display of a shape having a source surface by generating a zone connected to the source surface along boundaries, comprising the steps of:
    (a) defining boundaries of said zone as outer constraints as continuities $G^k$ along at least one part of said boundaries, with k being an integer at least equal to two;
    (b) defining inner constraints $G^k$ on points and curves to be respected by said zone when modified; with k being an integer at least equal to zero;
    (c) defining said zone as resulting from a resilient deformation of a generalized infinite thin planar plate in equilibrium, respecting said outer and inner constraints; and
    (d) generating a display of said source surface and said zone connected thereto at said boundaries.

6. A method of modifying a display of a zone of a surface of an original shape, comprising the steps of:
    (a) defining boundaries of said zone as outer constraints as continuities $G^k$ along at least one part of said boundaries, with k being an integer at least equal to minus one
    (b) defining inner constraints $G^n$ on points and curves to be respected by said zone when modified, with n being an integer at least equal to zero;
    (c) selecting a deformation direction law for all points of said zone;

(d) defining a deformation which corresponds to a minimum over the whole parametric space of:

$$E(\phi) = \int_{R^2} (\nabla^m \phi)^2$$

where $R^2$ is a two-dimensional parametric space on which said boundaries are projected,
$\nabla$ is the gradient operator,
m is a power at least equal to k+2, and
$\phi$ is a deformation function representing the deformation; and (e) generating the display of the modified zone as a surface resulting from an application of said deformation to said original shape in said zone.

* * * * *